CHARACTER ISOLATION APPARATUS

Filed May 9, 1966 6 Sheets-Sheet 1

INVENTORS
DOUGLAS R. ANDREWS
ALLAN J. ATRUBIN
RICHARD J. BAUMGARTNER
MILTON F. BOND
KUANG-CHI HU

BY Donald F Voss ATTORNEY

June 23, 1970 D. R. ANDREWS ET AL 3,517,387

CHARACTER ISOLATION APPARATUS

Filed May 9, 1966 6 Sheets-Sheet 2

CHARACTER ISOLATION APPARATUS

Filed May 9, 1966 6 Sheets-Sheet 6

United States Patent Office 3,517,387
Patented June 23, 1970

3,517,387
CHARACTER ISOLATION APPARATUS

Douglas R. Andrews, Allan J. Atrubin, Richard J. Baumgartner, Milton F. Bond, and Kuang-Chi Hu, Rochester, Minn., assignors to International Business Machines Corporation, Armonk, N.Y., a corporation of New York Filed May 9, 1966, Ser. No. 548,663
Int. Cl. G06k 9/12
U.S. Cl. 340—146.3 8 Claims

ABSTRACT OF THE DISCLOSURE

A look-ahead shift register for a character recognition system is provided with a selectively resettable reset area. Logic circuits for determining if a block containing character information is disconnected from either the right-side character or the left-side character, or from both characters, are connected to shift register positions bracketing the reset area. If the logic circuits are satisfied at a predetermined time, the register positions in the reset area are reset. An auxiliary shift register is selectively interposed between the look-ahead and recognition registers and stores character data from a next character while blank scan insertion circuitry inserts a blank scan into the recognition register along the side of the character therein. In this manner, only information relating to a presently scanned character is contained in the recognition register.

This invention relates to apparatus for isolating character patterns and more particularly to apparatus for collecting data bits resulting from scanning one character pattern adjacent to other character patterns without including data bits of the adjacent character patterns even though portions of these adjacent patterns are scanned while scanning said one character pattern. The term "collecting" is used here quite broadly and is directed to an end result. It encompasses deriving data bits representing a pattern and discarding data bits to provide a well-defined character outline, particularly at the right and left hand character edges and to prevent data bits belonging to adjacent characters from being considered with the data bits representing the character under examination.

It is quite common to have lines forming one character extend into the character spaces of adjacent characters such as in the case of serifs, descending tails and extending upward portions. The tail of a *y* sometimes extends into the left adjacent character space whereas the upper portion of the *r* extends into the right adjacent character space. The extremities of the serifs, tails and extenders usually do not have a lot of information critical to the recognition of the character to be identified and therefore the loss or elimination of the data contained therein is not serious. Conversely, the data in these elements becomes a confusion factor when associated with data representing an adjacent character. Therefore, it is quite important to eliminate this confusion data. Hence, the main goal of this invention is to present to the recognition circuits only that data which is part of a character to be recognized. Along with this goal is the preservation of confusion data, if necessary, until the time it can become recognition data. Another main goal of the invention is to logically separate touching characters and insert blank scan data between characters to aid in defining the left and right hand side characteristics.

Accordingly, a principal object of this invention is to prevent confusion data from being presented to the character recognition circuits.

Another very important object of this invention is to provide apparatus for separating confusion data from recognition data and storing the confusion data until it becomes recognition data.

Still another very important object of this invention is to logically separate touching characters and insert blank scan data between character data to improve the definition of the characters.

The foregoing and other objects, features and advantages of the invention will be apparent from the following more particular description of preferred embodiments of the invention, as illustrated in the accompanying drawings.

Figure 4A:
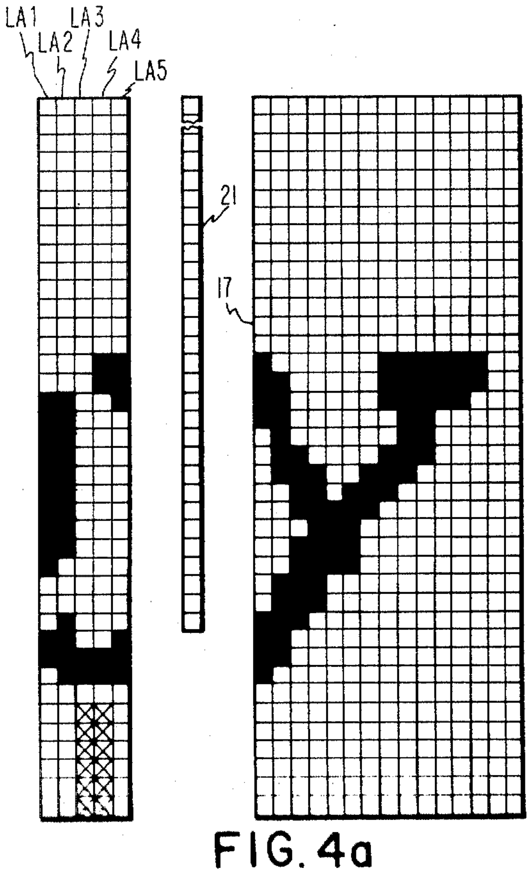
Figure 4B:
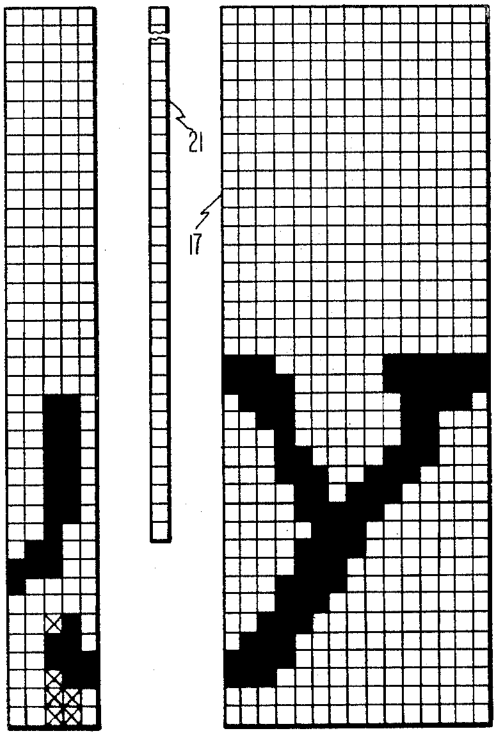
Figure 4C:
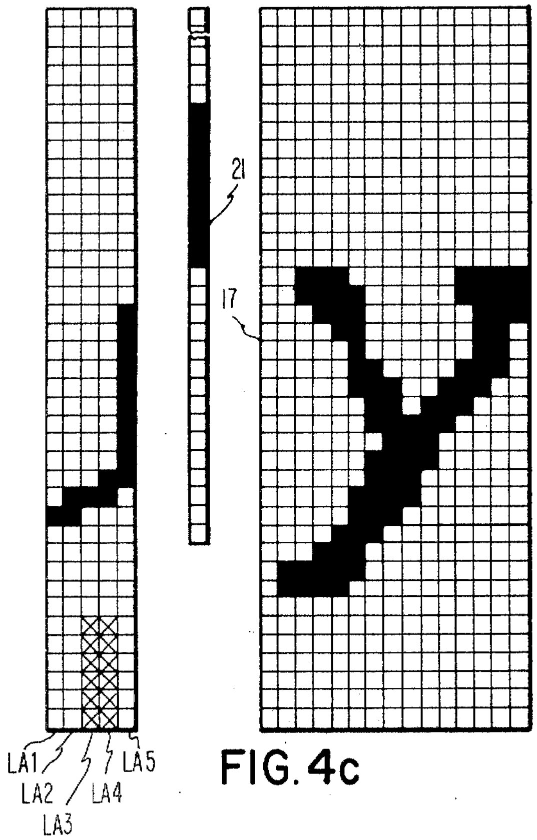
Figure 5:
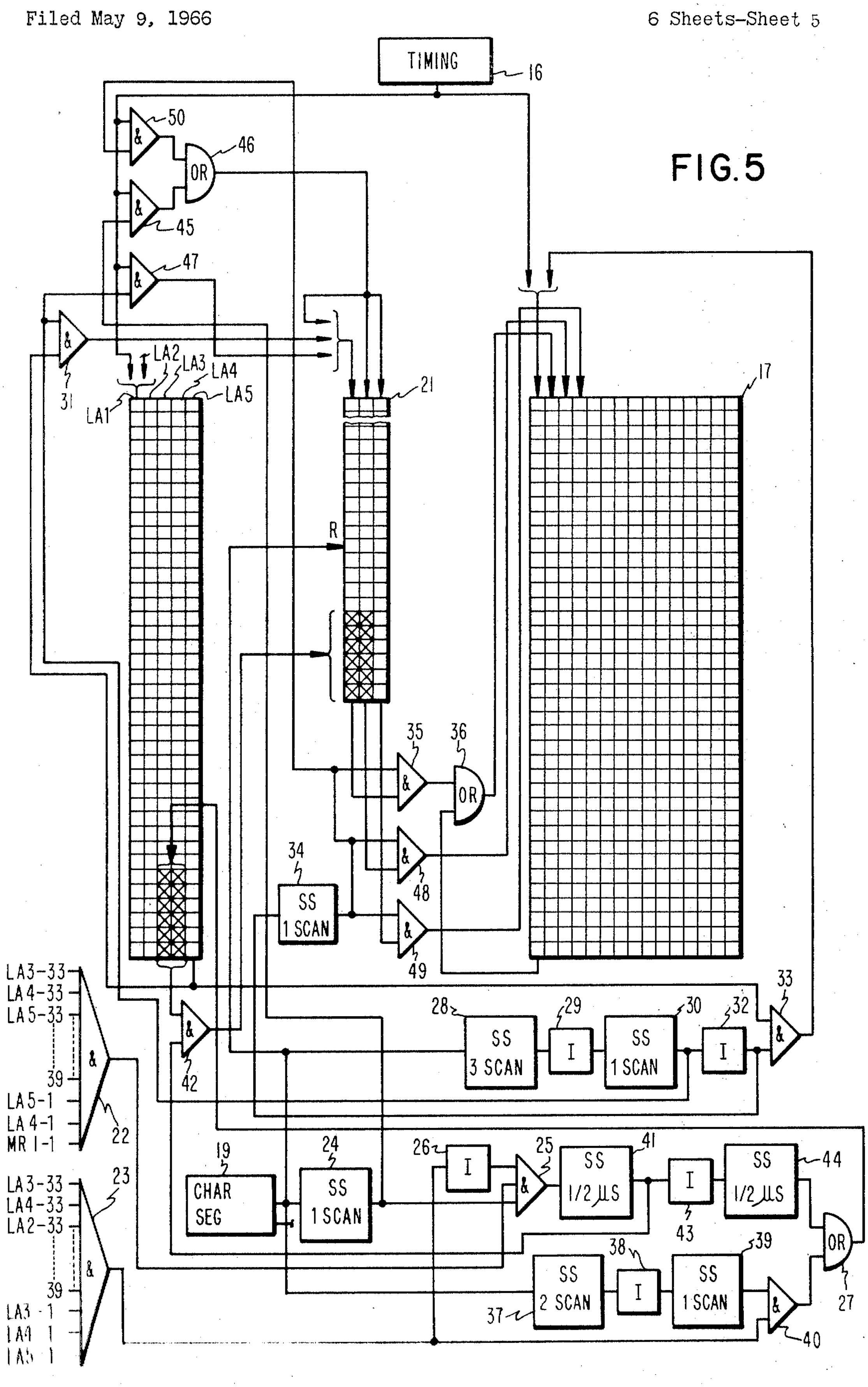

FIGS. 3*a*, 3*b*, 3*c*, 3*d*, 3*e* and 3*f* successively illustrate the clearing of an underhanging portion of a left adjacent character so as to prevent confusion data represented thereby from being considered by the recognition circuits together with the recognition data representing the right hand character, blank scan insertion is also illustrated;

FIGS. 4*a*, 4*b* and 4*c* successively illustrate elimination of a portion of a character on the right underhanging a left adjacent character, blank scan insertion is also illustrated;

FIG. 5 is a schematic logic diagram illustrating a second embodiment of the invention which includes apparatus for preventing confusion data from being considered by the recognition circuits, for blank scan insertion, and for separating confusion data from recognition data and storing the confusion data until it becomes recognition data; and FIGS. 6*a*, 6*b*, 6*c*, 6*d* and 6*e* successively illustrate clearing of an underhanging portion of a left adjacent character to thereby prevent confusion data from entering the main register with recognition data representing the right hand character and storing the underhanging portion of the left adjacent character until it becomes recognition data for entry into the main register together with the remainder of recognition data representing the left hand character, blank scan insertion is also illustrated.

Figure 1:
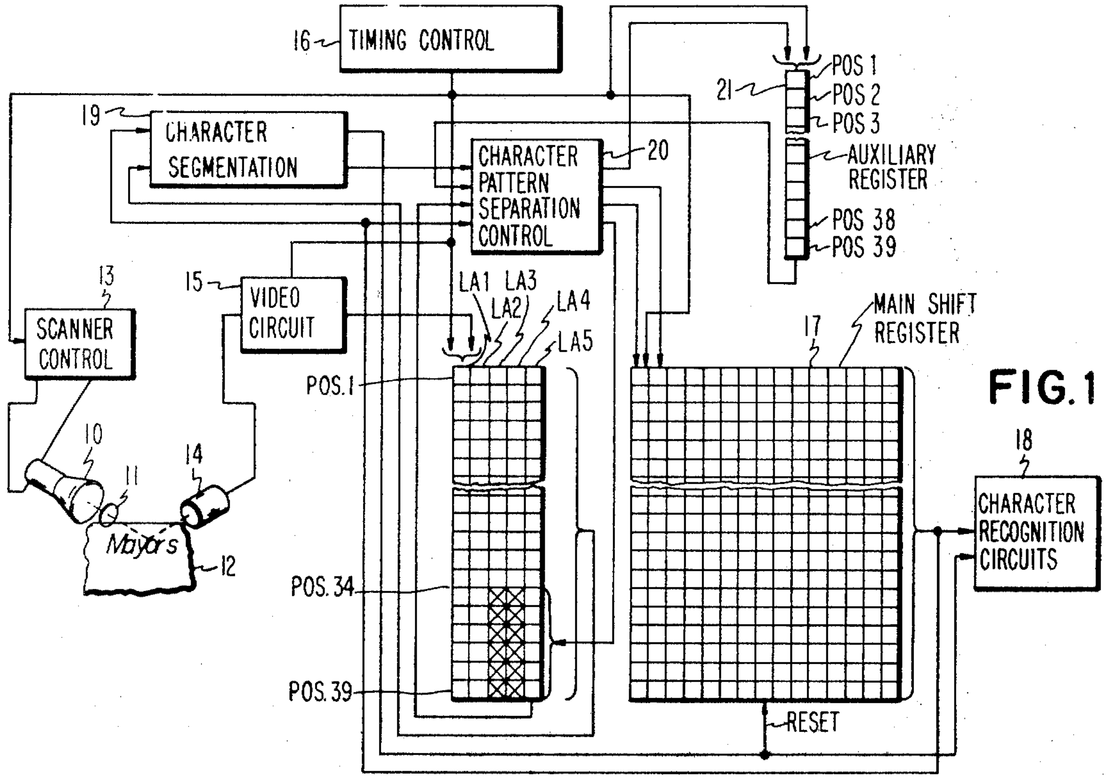
FIG. 1 is a schematic block diagram of a first embodiment of the invention which includes apparatus for separating confusion data from recognition data and for inserting a blank scan of data but does not include apparatus for storing the confusion data until it becomes recognition data.

With reference to the drawings, and particularly to FIG. 1, the invention is illustrated by way of example as being incorporated into a character recognition machine which includes a cathode ray tube 10 whose beam is imaged by lens 11 to scan the characters on document 12. Movement of the beam of cathode ray tube 10 is controlled by scanner control apparatus 13. In this particular example, the characters on a line are scanned continuously, i.e., one after the other, starting at the right hand side of a character and proceeding to the left from the bottom to the top of a character.

As the characters are scanned, the beam of the cathode ray tube 10 is reflected from document 12 to photomultiplier tube 14. The amount of light reflected from a character is generally substantially less than that reflected from the background area of document 12. Photomultiplier tube 14 is activated by the reflected light and essentially develops a signal at one level due to the light reflected by a character and develops a signal at another level from the light reflected by the background area.

The signals are both analog in amplitude and time and are termed the video signal. The video signal is then amplified and digitized in both amplitude and time by video circuit 15 which determines if the optical condition is black or white. In this particular example, the analog signal developed as a result of each vertical scan is digitized into 32 increments. Further, after one vertical scan of the character, the beam flies back angularly downward to the left as it is deflected both horizontally and vertically. The beam then makes another vertical scan from the bottom to the top of a character. The amount of time for beam flyback equals 7 increments and during flyback the video is considered to be white. The segments of a vertical scan and flyback are determined by timing signals from timing control circuit 16.

The digitized video data from circuit 15 is entered into look ahead register LA–1 under control of circuit 16. The digitized video data is then shifted serially from LA–1 through LA–2, LA–3, LA–4 and LA–5 and entered into shift register 17 under control of circuit 16. The look-ahead registers LA–1 through LA–5 are serially connected. The outputs of the last shift register positions of registers LA–1, LA–2, LA–3, and LA–4 are connected to the inputs of the first shift register positions of LA–2, LA–3, LA–4, and LA–5 respectively. The data exiting the last position of LA–5 is passed by control circuitry 20 to the first position of either register 17 or auxiliary register 21, as will be described in detail later herein. Shift register 17 is of the type shown and described in co-pending commonly assigned patent application Ser. No. 450,647, by Jack F. Bene et al., for Cross Correlation and Decision Making Apparatus, filed Apr. 26, 1965.

The information entered into shift register 17 should only relate to one character. Character recognition circuits 18 are connected to examine the data in register 17. The character recognition circuits 18 consider only the data entered into register 17 from the time of a previous reset of the register until the time a valid end-of-character or segmentation signal four scans delayed is received from the character segmentation circuit 19. The character recognition circuits 18 can be of the type shown and described in co-pending patent application Ser. No. 490,244 by Jack F. Bene et al. for Reference Selection Apparatus for Cross Correlation filed Sept. 27, 1965, now Pat. 3,384,875, and assigned to the same assignee as the present invention. The character segmentation circuitry 19 can be of the type shown and described in co-pending, commonly assigned patent application Ser. No. 504,457 by R. J. Baumgartner et al. for Character Separation Apparatus for Character Recognition Machines filed Oct. 24, 1965.

Although the character segmentation circuitry 19 activates character recognition circuitry 18 only after the character has been completely scanned, it cannot prevent confusion data from entering register 17. The character pattern separation control circuitry 20 functions to prevent confusion data from entering register 17 and prevents confusion data from remaining in look ahead registers LA–1 through LA–5. Control circuitry 20 also functions to logically separate touching characters by controlling insertion of a blank scan into register 17, and functions to control the transfer of data from LA–5 into auxiliary register 21. The auxiliary register 21 stores the data representing the first scan of the adjacent left character during the time a blank scan is entered into register 17. The blank scan is entered into register 17 to provide a clean left hand edge for the right hand character which had just been scanned. In this particular example, after segmentation occurs, four scan times are required to transfer all the information representing the character scanned into shift register 17 and to insure one blank scan at the left hand edge.

Look ahead registers LA–1 through LA–5 are serially connected and each register can contain information obtained during one scan. Look ahead registers LA–3 and LA–4 each have a six bit area which, as it will be seen shortly, is selectively resettable so as to prevent under or over hanging bits from a left hand character from entering register 17 together with bits representing the right hand character and for eliminating right hand character bits from the look ahead registers which over or under hang the left hand character. It should be noted that the reset area can be located almost anywhere in the look ahead registers, but the timing would have to be changed. The particular arrangement shown does not involve any splitting of scans and therefore is quite desirable.

Figure 2:
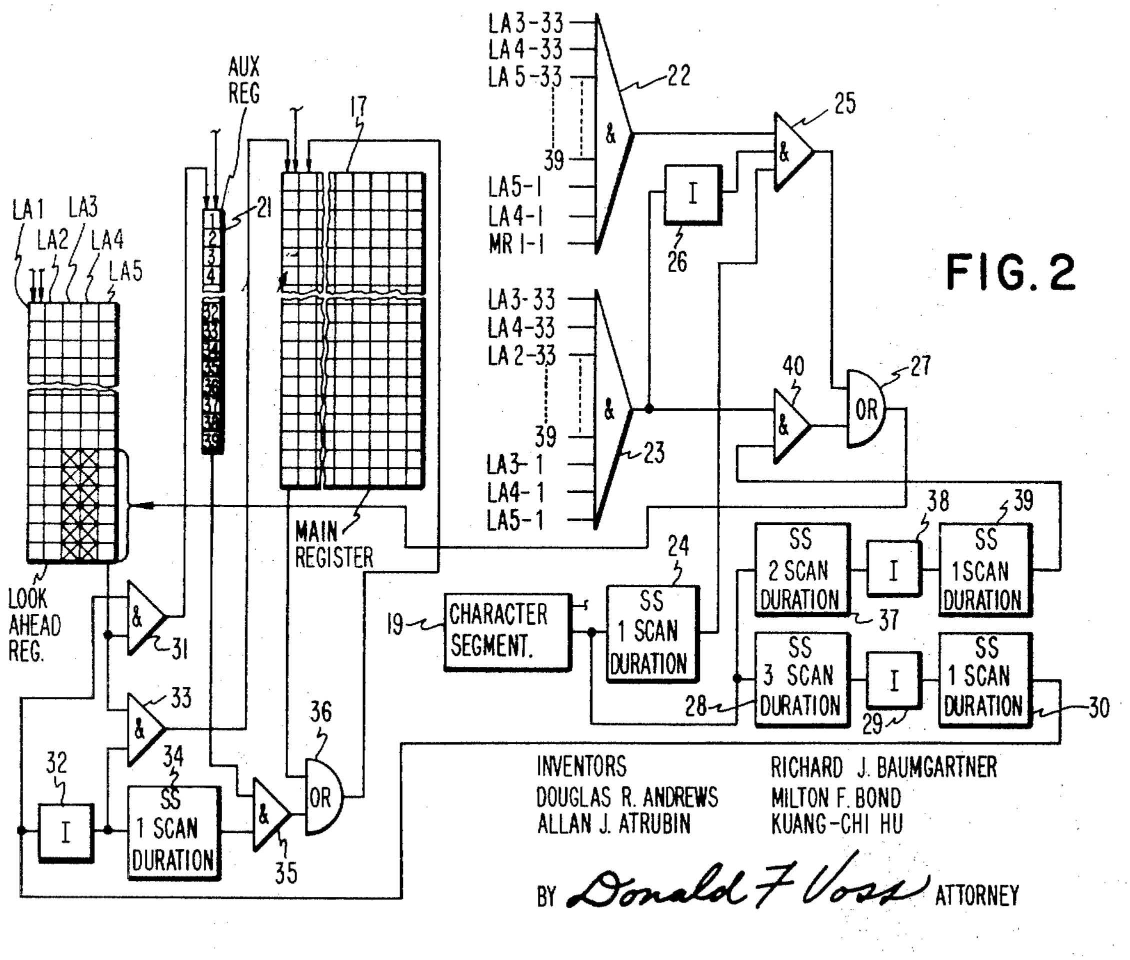
FIG. 2 is a schematic logic diagram of the pattern separation control block shown in FIG. 1.

Operators, and in this particular instance, logical AND circuits 22 and 23 of FIG. 2, are connected to bit positions in the look ahead registers and shift register 17 to detect under and over hanging bits. More specifically, logical AND circuit 22 looks for left hand character bits which are over or under hanging the right hand character. It has inputs connected to positions LA–3–33, LA–4–33, LA–5–33 through 39, LA–5–1, LA–4–1, and MR–1–1 where MR means main register 17. It should be remembered that each of the look ahead registers is a shift register and therefore the input conditions to logical AND circuit 22 can be satisfied at different times. The specific condition of left hand character bits under hanging a right hand character is illustrated by FIGS. 3*a* through 3*f*.

Figure 3A:
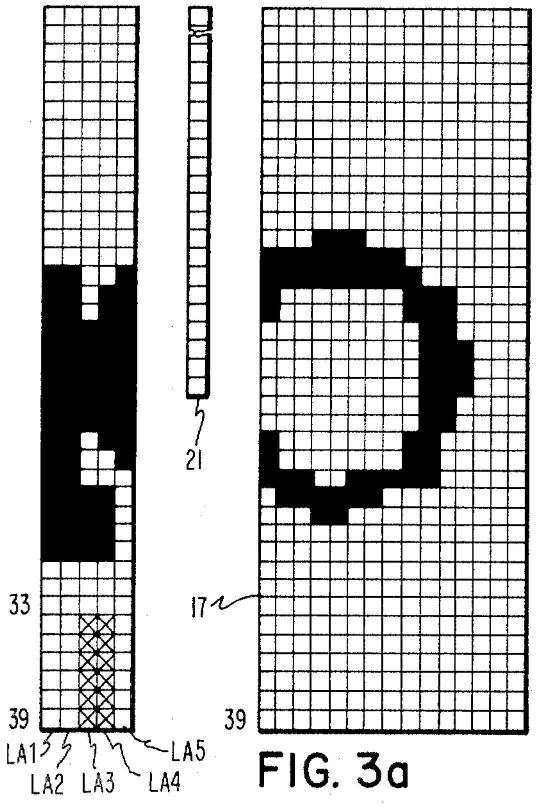
Figure 3B:
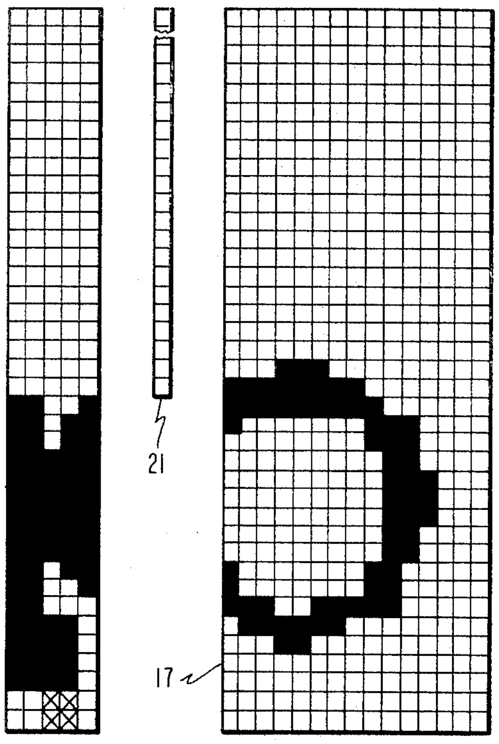

Segmentation occurs when the left hand boundary of the right hand character is in look ahead LA–3. This condition is represented in FIG. 3*a*. It should be noted that FIG. 3*a* represents an extreme condition where the right hand character abuts against the left hand character. The left hand character bits under hanging the right hand character are also detected when the characters do not abut each other. The input conditions to logical AND circuit 22 are satisfied when the data representing the character are in positions represented in FIG. 3*b*. This occurs during the first scan following segmentation. Referring again to FIG. 2, the segmentation signal from circuit 19 fires singleshot multivibrator 24 which has a duration of one scan. The output signal from 24 is applied to condition AND circuit 25. AND circuit 25 also has inputs from AND circuit 22 and inverter 26. Inverter 26 is connected to receive a signal from AND circuit 23. By this arrangement, AND circuit 25 will not pass a signal when both AND circuits 22 and 23 are satisfied.

Figure 3C:
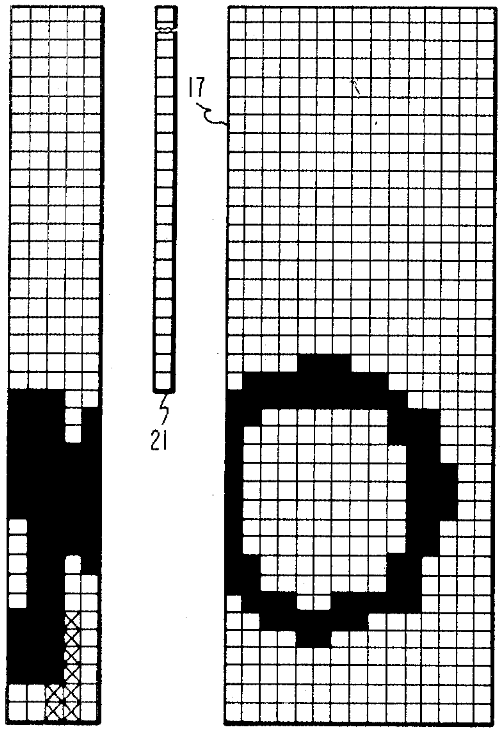
Figure 3D:
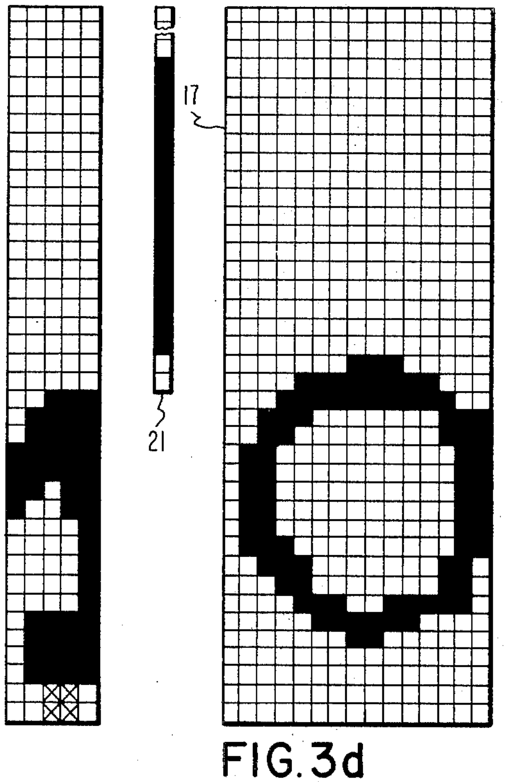
Figure 3E:
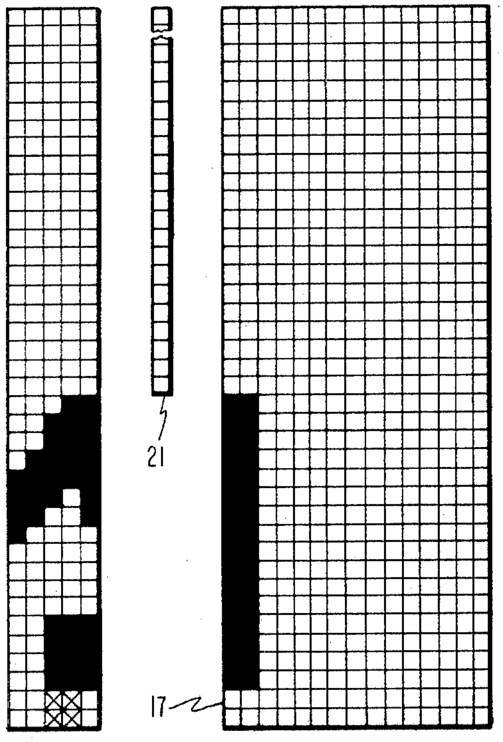

The output of AND circuit 25 is applied to OR circuit 27 which has its output connected to reset the six bit positions marked by *x*'s of look ahead registers LA–3 and LA–4. Thus, the left hand character bits in FIG. 3*b* under hanging the right hand character are eliminated and therefore will not transfer into register 17 together with right hand character bits. FIG. 3*c* shows the bit conditions of the right and left hand characters one scan later. The next scan condition is not shown; however, FIG. 3*d* represents the location of the character bits upon completion of the fourth scan after segmentation. During the fourth scan after segmentation, the data in LA–5 is transferred to auxiliary register 21 and data is prevented from entering MR–1 of 17.

This transfer is accomplished through the facility of logic circuitry shown in detail in FIG. 2. Specifically, singleshot multivibrator 28 has a three scan duration and it is fired by the segmentation signal from 19. The output of 28 is applied to inverter 29 which applies its output signal to singleshot multivibrator 30. Singleshot multivibrator 30 has a one scan duration, and its output conditions AND circuit 31 to facilitate the transfer of data from LA–5 to auxiliary register 21. The output of 30 is also applied to inverter 32 to inhibit AND circuit 33 and thereby prevent data in LA–5 from entering MR–1 at this time. The output of 32 is also applied to singleshot multivibrator 34 which has a duration of one scan. Thus 34 provides a gating signal during the fifth scan after segmentation. This gating signal is applied to AND circuit 35 to facilitate the transfer of data in register 21 into MR–2 of 17 via OR circuit 36. The segmentation signal from 19 delayed by four scans indicates to the character recognition circuitry 18 that the entire character has been entered into register 17. Thus character recognition circuitry 18 only considers data in register 17 which represents a single character. It should be noted that register 17 is reset at the end of the fourth scan after segmentation.

Figure 3F:
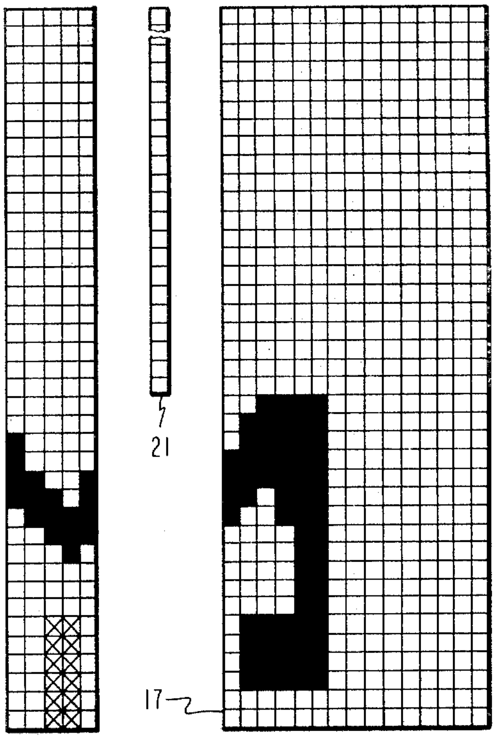

During the fifth scan after segmentation, or the first scan after register 17 has been reset, the data from register 21 is entered into the second column of 17 while data is simultaneously entered from look ahead register LA–5 into the first column of 17. This is possible because AND circuits 33 and 35 are both conditioned. FIG. 3*f* shows the left hand character entering register 17 several scans later.

It is seen that the botton right hand part of the serif of the left hand character has been lost. The information contained by this portion of the serif is not particularly significant with respect to the recognition of the left hand character and therefore its loss will not substantially reduce the chances of recognizing the left hand character. On the other hand, if the data contained in this portion of the serif had entered register 17 together with the data representing the right hand character, it is quite likely that the character recognition circuits 18 would not have properly identified the right hand character. Of course, if the information contained in the right hand portion of the serif were vital to the recognition of the left hand character, then this information can be preserved, as will be seen in connection with the second embodiment of the invention.

In order to detect right hand character bits under or over hanging a left hand character, logical AND circuit 23 has inputs connected to LA–3–33, LA–4–33, LA–2–33 through 39, LA–3–1, LA–4–1, and LA–5–1. FIG. 4*a* represents an instance where right hand character bits are under hanging a left hand character. Further, in FIG. 4*a*, so far as circuitry 19 is concerned, the left hand boundary of the right hand character is in LA–3. Therefore, at the end of two scans after segmentation, all data bits of the right hand character not under hanging the left hand character should be out of the reset area of LA–3 and LA–4. Ths condition is represented in FIG. 4*b*. Then, if logical AND circuit 23 is satisfied during any time of the third scan after segmentation, the bits in the reset area of LA–3 and LA–4 will be destroyed. By this arrangement, none of the right hand character bits under hanging the left hand character will enter into register 17 with left hand character bits.

The particular circuitry for performing the described function is shown in FIG. 2. The character segmentation signal from 19 is applied to singleshot multivibrator 37 which has a two scan duration. Its output is applied to inverter 38. The output of inverter 38 is applied to singleshot multivibrator 39 which has a one scan duration. The output of 39 is applied to condition AND circuit 40 which also has an input from AND circuit 23. The output of 40 is applied to OR circuit 27.

This completes the description of the first embodiment. From the foregoing it is seen that the first embodiment includes apparatus for preventing confusion data from being presented to the character recognition circuits. Specifically, the first embodiment is capable of preventing left hand character bits over or under hanging right hand character bits from entering register 17 with the right hand character bits. It also prevents right hand character bits over or under hanging left hand character bits from entering register 17 with the left hand character bits. It also includes apparatus for inserting a blank scan adjacent to the left hand edge of a character in register 17. This improves the chance of circuits 18 recognizing the character in register 17. It is also seen that the first embodiment does not have the provision for storing confusion data until it can become recognition data. This latter capability is provided in the second embodiment of the invention.

The second embodiment of the invention is shown in FIG. 5 and like elements to the first embodiment will be given the same reference character as in the first embodiment. However, those elements which are common to both embodiments such as elements 10, 11, 12, 13, 14, 15 and 18 but which are not necessary to the understanding of the second embodiment are not shown in FIG. 5. Further, auxiliary register 21 is expanded into a three column register. The second embodiment will be best understood by referring to FIGS. 5 and 6*a* through 6*e*. In the second embodiment, if the input conditions to logical AND circuit 22 are satisfied any time during the first scan after segmentation and the input conditions to logical AND circuit 23 are not satisfied, AND circuit 25 passes a signal for firing singleshot multivibrator 41 which has a one-half microsecond duration. The signal from 41 is applied to AND circuit 42 to condition the same for transferring data in the reset area of LA–3 and LA–4 to corresponding bit positions in columns 1 and 2 of register 21 respectively. The output of 41 is also applied to inverter 43 which has its output connected to singleshot multivibrator 44. Singleshot multivibrator 44 also has a duration of one-half microsecond and its output is connected to OR circuit 27 which as it will be recalled has its output connected to reset the reset area in LA–3 and LA–4.

Figure 6A:
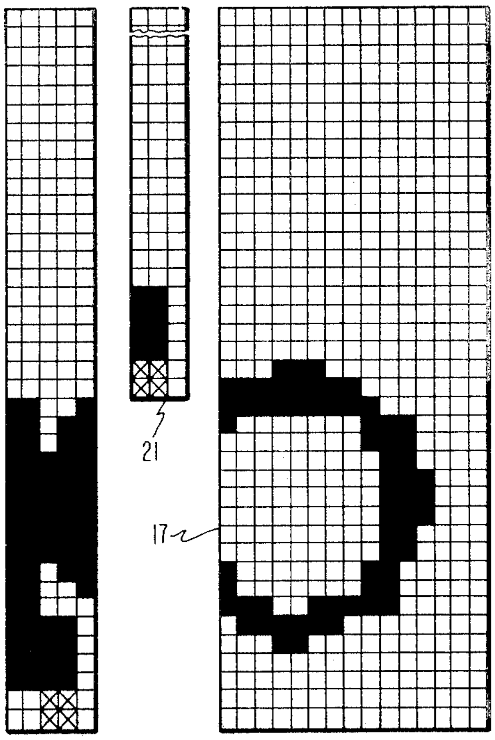
Figure 6B:
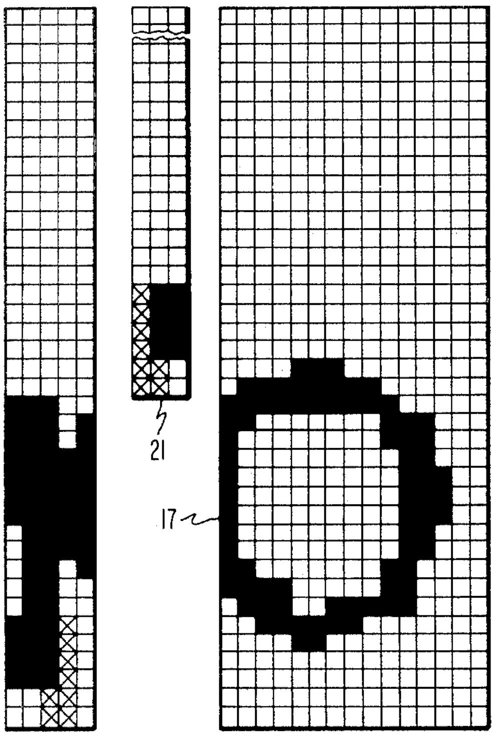
Figure 6C:
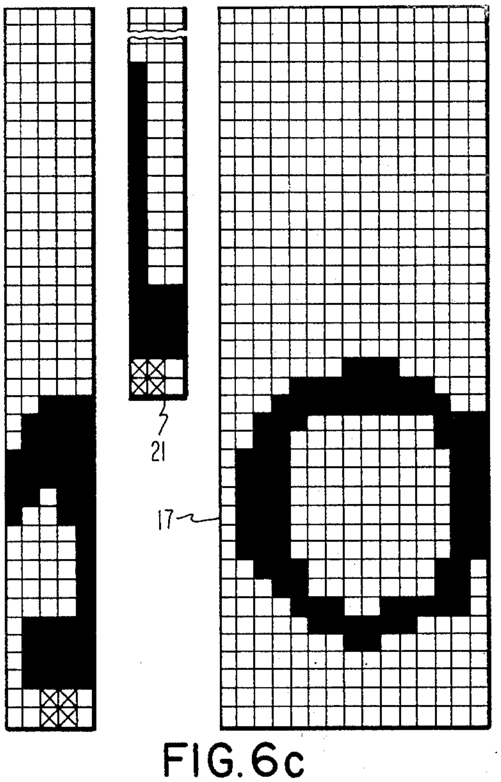
Figure 6D:
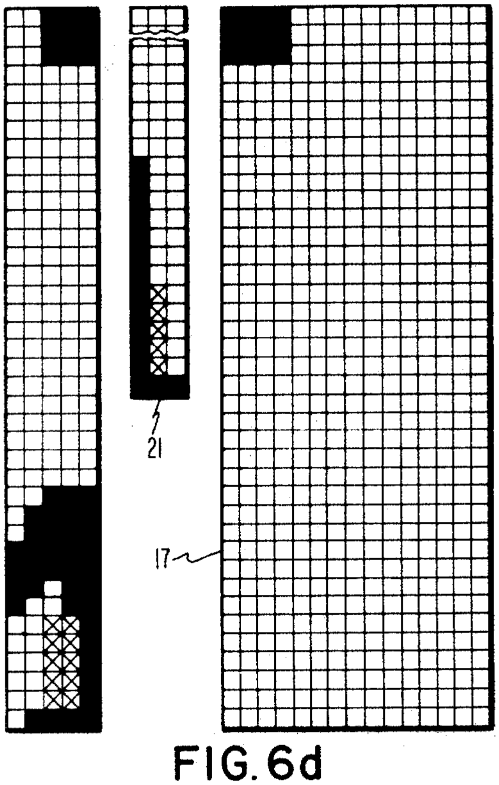
Figure 6E:
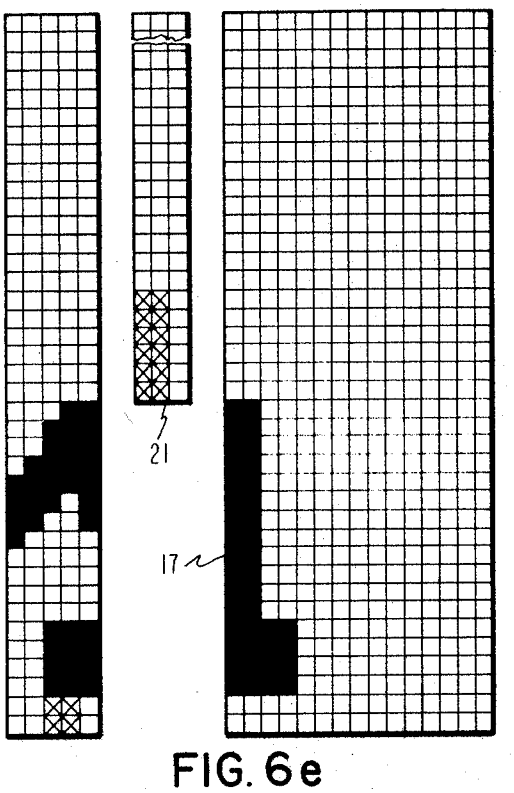

By this arrangement, the right hand portion of the lower serif for the left hand character is preserved. However, it will not enter into register 17 together with data bits representing the right hand character. It should be noted that as data bits are entered into register 21, they are also shifted during the scan following segmentation because the output of 24 is applied to AND circuit 45 which also receives shift pulses from timing control 16. The shift pulses from 45 are applied to 21 via OR circuit 46. FIG. 6*a* illustrates the bits in the registers at the beginning of the first scan after segmentation and FIG. 6*b* shows the condition of the data bits in the registers at the end of one scan after segmentation. FIG. 6*c* shows the right hand character completely shifted into register 17 and with a blank scan inserted adjacent to the left hand edge of the right hand character. Further, during the insertion of the blank scan into register 17, a scan of data from LA–5 is transferred into the first column of register 21. This is accomplished in a manner similar to that of the first embodiment. Logical AND circuit 31 is conditioned by the signal from singleshot multivibrator 30 and it passes the data from LA–5 into the first column of register 21. During this time, the data is shifted into 21 by pulses passed by AND circuit 47. AND circuit 47 has an input from singleshot multivibrator 30 and an input from timing control 16. During the fifth scan after segmentation which is after register 17 has been reset, data from LA–5 and from register 21 is entered into the first four columns of register 17. The output of singleshot multivibrator 34 conditions AND circuit 35 as in the first embodiment and it also conditions logical AND circuits 48, 49 and 50. Logical AND circuits 35, 48 and 49 function to pass data from columns 1, 2 and 3 of register 21 into columns 2, 3 and 4 respectively of register 17. Data from LA–5 is entered at this time into column 1 of register 17 via logical AND circuit 33. FIG. 6*d* shows the data shifting within the look ahead registers, the auxiliary register 21 and the main register 17. FIG. 6*e* shows that the data has been completely transferred from register 21 into register 17.

From the foregoing, it is seen that the second embodiment has all the capabilities of the first embodiment but in addition has the ability to store the confusion data until it can become recognition data. Further, it should be noted that the second embodiment only contains the logic circuitry for effecting storage of left hand character bits over or under hanging right hand character bits. It should be recognized that it is within the scope of the invention to preserve the right hand character bits over or under hanging the left hand character bits if this be desired.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Character isolation apparatus comprising:

data storage means for storing data bits derived in response to scanning a character space, means for entering said derived data bits into said data storage means as a character is being scanned, means for determining when a character has been completely scanned, means for inserting a blank scan of data into said data storage means during the next scan after said determining means has determined that a character has been completely scanned, and auxiliary storage means for storing data during said next scan while a blank scan of data is inserted into said data storage means.

2. The character isolation apparatus of claim 1 further comprising:

means for simultaneously entering scanned data into said data storage means from said auxiliary storage means and as data is derived by scanning the adjacent character space during the scan following said next scan.

3. The character isolation apparatus of claim 1 wherein said data storage means and said auxiliary storage means are shift registers.

4. In a character recognition system having a scanner for generating digitized video data bits in response to scanning characters on a document and character segmentation means for providing a signal indicating that a character has been completely scanned, the improvement comprising:

a first shift register connected to receive digitized video data bits and having a selectively resettable reset area, a second shift register having an input connected to the output of said first shift register and having outputs connected to character recognition circuits of said character recognition system, logic means having inputs connected to shift register positions bracketing said reset area and an output connected to the shift register positions in said reset area, and timing means operable in response to a signal generated by said segmentation means for generating at least one signal for conditioning said logic means, whereby if said logic means are satisfied by the bit conditions of the shift register positions connected to said logic means, then said logic means generates a signal for resetting the shift register positions in said reset area.

5. The character recognition system of claim 4, further comprising:

an auxiliary shift register selectively connectable between the output of said first shift register and another input of said second shift register and means controlled by said timing means for selectively connecting said auxiliary shift register to said output of said first shift register and said another input of said second shift register.

6. The character recognition apparatus of claim 4 wherein said timing means generates a signal having a duration of one scan.

7. The character recognition apparatus of claim 4 wherein said timing means generates a signal two scans delayed from said end-of-character signal and having a duration of one scan.

8. In a character recognition system having a scanner for scanning characters on a document and generating digitized video data bits in response to scanning said characters;

a shift register having an input connected to receive said data bits, said shift register having at least one group of selectively resettable shift register positions, logic circuit means having inputs connected to shift register positions adjacent to said selectively resettable shift register positions, means for generating an end-of-character signal, an auxiliary shift register including a group of shift register positions corresponding to said one group of shift register positions, means for selectively transferring data bits from said one group to said corresponding group of shift register positions, and timing means responsive to said end-of-character signal for generating a first signal to selectively condition said logic means and responsive to an output signal from said logic means for generating a second signal to enable said data transferring means to transfer data bits from said one group to said corresponding group of shift register positions and thereafter generate a third signal for resetting said one group of selectively resettable shift register positions.

References Cited

UNITED STATES PATENTS

| | | | |
|---|---|---|---|
| 3,164,806 | 1/1965 | Rabinow | 340—146.3 |
| 3,199,080 | 8/1965 | Rabinow et al. | 340—146.3 |
| 3,219,974 | 11/1965 | Rabinow | 340—146.3 |
| 3,234,511 | 2/1966 | Brust et al. | 340—146.3 |
| 3,303,466 | 2/1967 | Holt | 340—146.3 |
| 3,344,399 | 9/1967 | Bonner | 340—146.3 |
| 3,234,513 | 2/1966 | Brust | 340—146.3 |

MAYNARD R. WILBUR, Primary Examiner

L. H. BOUDREAU, Assistant Examiner